(12) United States Patent
Pasquero et al.

(10) Patent No.: US 10,642,933 B2
(45) Date of Patent: *May 5, 2020

(54) METHOD AND APPARATUS FOR WORD PREDICTION SELECTION

(71) Applicant: BlackBerry Limited, Waterloo (CA)

(72) Inventors: Jerome Pasquero, Montreal (CA); Donald Somerset McCulloch Mckenzie, Waterloo (CA); Jason Tyler Griffin, Kitchener (CA)

(73) Assignee: BlackBerry Limited, Waterloo, Ontario (CA)

(*) Notice: Subject to any disclaimer, the term of this patent is extended or adjusted under 35 U.S.C. 154(b) by 864 days.

This patent is subject to a terminal disclaimer.

(21) Appl. No.: 14/921,673

(22) Filed: Oct. 23, 2015

(65) Prior Publication Data

US 2016/0041966 A1 Feb. 11, 2016

Related U.S. Application Data

(63) Continuation of application No. 13/834,932, filed on Mar. 15, 2013, now Pat. No. 9,189,157.

(51) Int. Cl.
*G06F 3/0488* (2013.01)
*G06F 3/0489* (2013.01)
(Continued)

(52) U.S. Cl.
CPC .......... *G06F 17/276* (2013.01); *G06F 3/0236* (2013.01); *G06F 3/0237* (2013.01);
(Continued)

(58) Field of Classification Search
CPC .............. G06F 3/0489; G06F 3/04895; G06F 3/04897; G06F 3/04886; G06F 3/0233;
(Continued)

(56) References Cited

U.S. PATENT DOCUMENTS 5,818,437 A 10/1998 Grover et al.
2008/0266263 A1* 10/2008 Motaparti ............. G06F 3/0237
345/169
(Continued)

FOREIGN PATENT DOCUMENTS

WO 2010/035574 4/2010

OTHER PUBLICATIONS

Russell, R.; "Visual Basic Concepts—Using Menus in Your Application"; Jan. 25, 2004, <http://www.rupert.id.au/vb/notes>.
(Continued)

*Primary Examiner* — Ting Z Lee
(74) *Attorney, Agent, or Firm* — Fish & Richardson P.C.

(57) ABSTRACT

Methods and apparatuses are provided for improving word prediction candidate selection in an electronic device. Input of one or more characters is received via a capacitive physical keyboard. A word prediction process generates a set of word prediction candidates, determines a unique character in each word prediction candidate, and displays the word prediction candidates along with visual indicia to indicate the unique character. A second input is then received comprising a tap input of a single character on the keyboard. The electronic device determines whether the second input corresponds to a unique character associated with any of the word prediction candidates, and if so, displays the selected word in an input field on the display.

20 Claims, 11 Drawing Sheets

(51) Int. Cl.
 *G06F 3/023* (2006.01)
 *G06F 17/24* (2006.01)
 *G06F 17/27* (2006.01)

(52) U.S. Cl.
 CPC .......... *G06F 3/04886* (2013.01); *G06F 17/24* (2013.01); *G06F 3/0233* (2013.01); *G06F 3/0489* (2013.01); *G06F 3/04895* (2013.01); *G06F 3/04897* (2013.01)

(58) Field of Classification Search
 CPC .... G06F 3/0237; G06F 3/0236; G06F 17/276; G06F 17/24
 See application file for complete search history.

(56) References Cited

U.S. PATENT DOCUMENTS

| | | | |
|---|---|---|---|
| 2008/0281583 | A1 | 11/2008 | Slothouber et al. |
| 2010/0292984 | A1 | 11/2010 | Huang et al. |
| 2011/0010655 | A1 | 1/2011 | Dostie et al. |
| 2011/0119046 | A1 | 5/2011 | Shinozaki et al. |
| 2011/0161809 | A1* | 6/2011 | Gilmour ............... G06F 1/1626 715/702 |
| 2011/0285555 | A1 | 11/2011 | Bocirnea |
| 2012/0092278 | A1 | 4/2012 | Yamano |
| 2012/0119997 | A1 | 5/2012 | Gutowitz |
| 2012/0223889 | A1 | 9/2012 | Medlock et al. |
| 2014/0282201 | A1 | 9/2014 | Pasquero et al. |

OTHER PUBLICATIONS

Russell, R.; "Visual Basic 6.0 Notes"; Feb. 16, 2004, <http://www.rupert.id.au/vb/notes.html>.

Office Action issued in Canadian Application No. 2,846,561 dated Jul. 30, 2015.

Communication Pursuant to Article 94(3) EPC issued in European Application No. 13159459.0 dated Nov. 28, 2016.

"Method of hover assistance text entry on touched based input devices," IP.com Journal, West Henrietta, NY, USA, published online Mar. 1, 2012.

Extended European Search Report from the European Patent Office for corresponding EP Application No. 13159459.0, dated Aug. 7, 2013 (7 pages).

Summons to attend oral proceeding pursuant Rule 115(1) EPC issued in European Application No. 13159459.0 on Jun. 1, 2018, 14 pages.

Decision to Refuse a European Patent Application issued in European Application No. 13159459.0 dated Dec. 20, 2018, 15 pages.

* cited by examiner

METHOD AND APPARATUS FOR WORD PREDICTION SELECTION

CLAIM OF PRIORITY

This application is a continuation of and claims priority to U.S. patent application Ser. No. 13/834,932, filed on Mar. 15, 2013, the entire contents of which are hereby incorporated by reference.

FIELD

This application generally relates to input methodologies for electronic devices, such as handheld electronic devices, and more particularly, to methods for selecting word prediction candidates during text input using the features of a keyboard.

BACKGROUND

Advances in technology permit electronic devices, such as computers, netbooks, cellular phones, smart phones, personal digital assistants, tablets, etc., to process text input increasingly quickly and on increasingly smaller devices and keyboards. Examples include word prediction and disambiguation algorithms configured to suggest or recommend during the input process and, in some instances before the process is completed, words that users are trying to type. These functions increase both data entry speed and accuracy. Many users now demand and depend on these features. Nevertheless, further optimization of textual entry is desirable.

DETAILED DESCRIPTION

Figure 1:
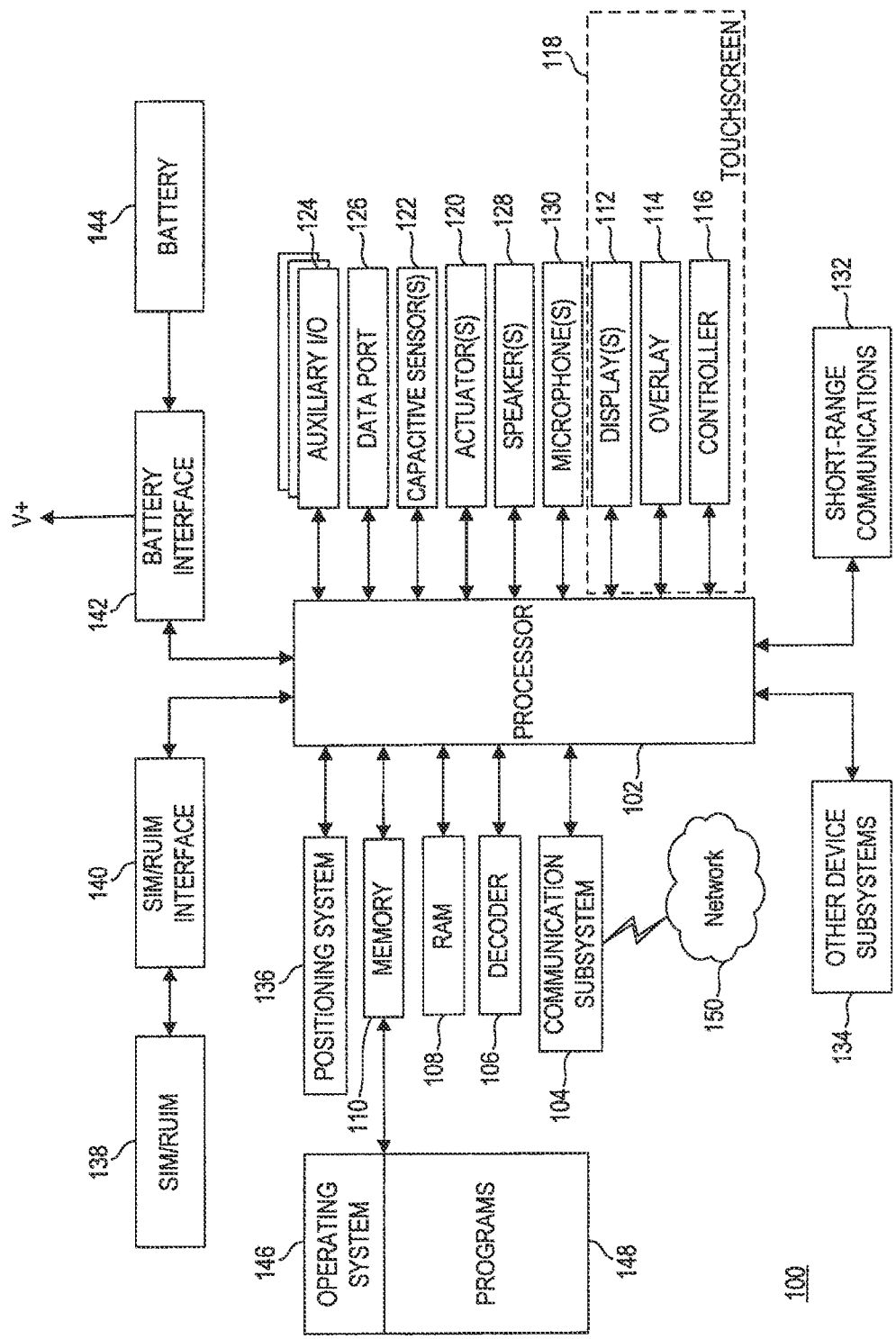
FIG. 1 is an example block diagram of an electronic device, consistent with embodiments disclosed herein.

Reference will now be made in detail to the disclosed example embodiments, examples of which are illustrated in the accompanying drawings. Wherever possible, the same reference numbers will be used throughout the drawings to refer to the same or like parts.

Use of the indefinite article "a" or "an" in the specification and the claims is meant to include one or more than one of the feature that it introduces, unless otherwise indicated. Thus, the term "a set of characters" as used in "generating a set of characters" can include the generation of one or more than one set of characters. Similarly, use of the definite article "the," or "said," particularly after a feature has been introduced with the indefinite article, is meant to include one or more than one of the feature to which it refers (unless otherwise indicated). For example, the term "the generated set of characters" as used in "displaying the generated set of characters" includes displaying one or more generated set of characters. Directional references to graphical user interface (GUI) elements, such as top and bottom, are intended to be relative to a current screen orientation (which may be changed) rather than any physical orientation of the host device.

Methods and apparatuses are provided to increase the speed of word entry by providing selection of candidate words generated by a word prediction algorithm with a single tap on a key.

In one embodiment, a method is disclosed for operating an electronic device having a display and a keyboard for receiving inputs. The method includes receiving a first input of one or more characters. Additionally, the method includes generating a set of word prediction candidates associated with the input and displaying the set of word prediction candidates on the display. The method further includes receiving a second input of a single character, and determining a particular word prediction candidate from among the generated set of word prediction candidates based on the second input. Further, the method includes presenting the particular word prediction candidate on the display for selection.

In another embodiment, an electronic device having a display and a keyboard for receiving inputs is disclosed. The device further comprises a memory containing instructions, and one or more processors configured to execute the instructions. The one or more processors are configured to execute the instructions to receive a first input of one or more characters. Additionally, the one or more processors are configured to generate a set of word prediction candidates associated with the input and display the set of word prediction candidates on the display. The one or more processors are further configured to receive a second input of a single character, and determine a particular word prediction candidate from among the generated set of word prediction candidates based on the second input. Further, the one or more processors are configured to present the particular word prediction candidate on the display for selection.

FIG. 1 is a block diagram of an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

Main processor 102 is coupled to and can interact with additional subsystems such as a Random Access Memory (RAM) 108; a memory 110, such as a hard drive, CD, DVD, flash memory, or a similar storage device; one or more actuators 120; one or more capacitive sensors 122; an auxiliary input/output (I/O) subsystem 124; a data port 126; a speaker 128; a microphone 130; short-range communications 132; other device subsystems 134; and a touchscreen 118.

Touchscreen 118 includes a display 112 with a touch-active overlay 114 connected to a controller 116. User-interaction with a graphical user interface (GUI), such as a virtual keyboard rendered on the display 112 as a GUI for input of characters, or a web-browser, is performed through touch-active overlay 114. Main processor 102 interacts with touch-active overlay 114 via controller 116. Characters, such as text, symbols, images, and other items are displayed on display 112 of touchscreen 118 via main processor 102. Characters are input when, for example, a user touches the touchscreen at a location associated with said character.

Touchscreen 118 is connected to and controlled by main processor 102. Accordingly, detection of a touch event and/or determining the location of the touch event can be performed by main processor 102 of electronic device 100. A touch event includes in some embodiments, a tap by a finger, a swipe by a finger, a swipe by a stylus, a long press by finger or stylus, or a press by a finger for a predetermined period of time, and the like.

While specific embodiments of a touchscreen are described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

Main processor 102 can also interact with a positioning system 136 for determining the location of electronic device 100. The location can be determined in any number of ways, such as by a computer, by a Global Positioning System (GPS), either included or not included in electric device 100, through a Wi-Fi network, or by having a location entered manually. The location can also be determined based on calendar entries.

In some embodiments, to identify a subscriber for network access, electronic device 100 uses a Subscriber Identity Module or a Removable User Identity Module (SIM/RUIM) card 138 inserted into a SIM/RUIM interface 140 for communication with a network, such as network 150. Alternatively, user identification information can be programmed into memory 110.

Electronic device 100 also includes an operating system 146 and programs 148 that are executed by main processor 102 and are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, an instant message, or a web page download is processed by communication subsystem 104 and this processed information is then provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

Figure 2A:
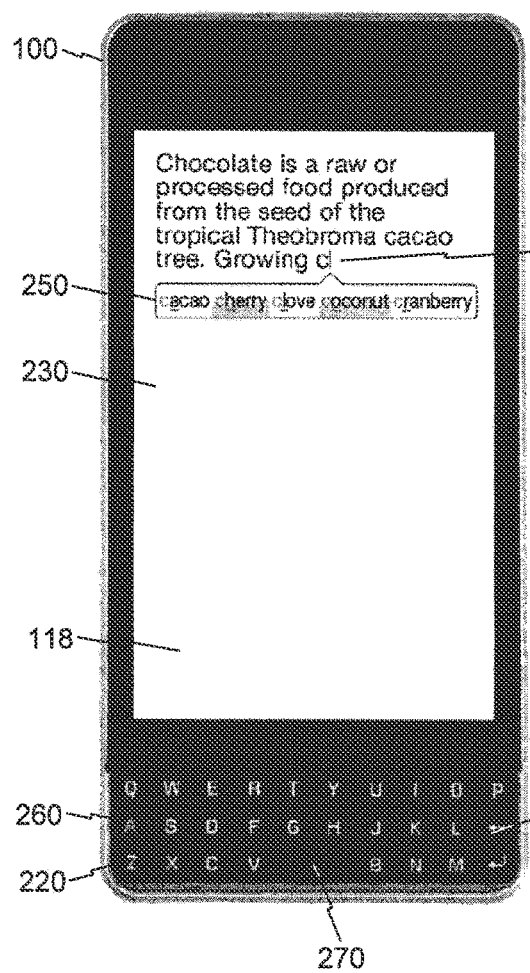
FIGS. 2A-2B, 3A-3B, 4A-4B, 5A-5B, and 6A-6B show examples of an electronic device, consistent with embodiments disclosed herein.
Figure 2B:
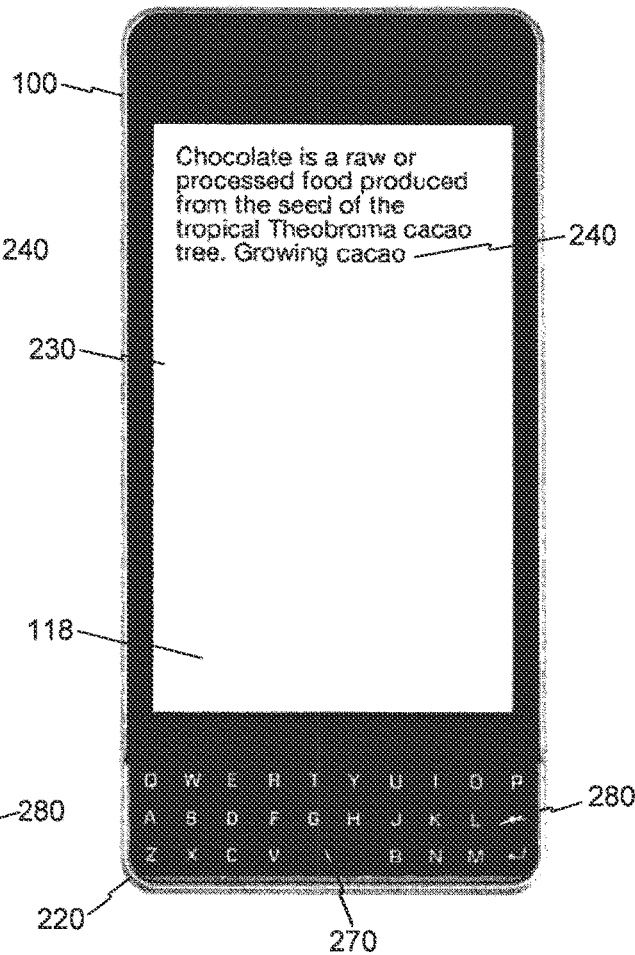

FIGS. 2A-2B illustrate examples of electronic device 100. For example, FIG. 2A illustrates a touchscreen 118 and a keyboard 220. In some embodiments, keyboard 220 is a capacitive physical keyboard, comprising a series of key covers overlaid on top of physical or electronic dome switches. Further, the capacitive physical keyboard contains actuators 120 and capacitive sensors 122 that permit both tactile input via depression of the key covers on top of the actuators 120 and gesture input via capacitive sensors 122. The input resolution of keyboard 220 is at least to the level of a single key; in other words, responsive to an input received via keyboard 220, processor 102 is capable of detecting which one of the plurality of keys of keyboard 220 was contacted. In some embodiments, an input received via keyboard 220 can be localized to precise coordinates in the X and Y directions on the keyboard via capacitive sensors 122. Alternatively, keyboard 220 may be a virtual keyboard displayed on touchscreen 118.

As used herein, a "key press" input received by keyboard 220 means a depression of one of the plurality of keys associated with one of the actuators 120 to an extent that is sufficient to engage the physical or electronic dome switch associated with that key. In contrast, a "tap" input received by keyboard 220 means a touch input of one of the plurality of keys associated with one of the actuators 120 for a duration less than or equal to about 0.5 seconds which does not engage the physical or electronic dome switch associated with that key. In some embodiments, keyboard 220 may be configured in a manner such that the duration of a tap input may be more than 0.5 seconds. In alternative embodiments, keyboard 220 may be configured in a manner such that the duration of a tap input may be more than 0.5 seconds. The input may be registered by one or more capacitive sensors 122. Alternatively, in some embodiments keyboard 220 may be a virtual keyboard implemented with touchscreen 118, which, like a capacitive physical keyboard, is programmable to distinguish between different types of touch events like the key press and tap inputs described above. For example, the virtual keyboard may distinguish these types of events based on pressure sensed on touchscreen 118, or by measuring the duration of a touch event.

The position of the keyboard 220 is variable relative to touchscreen 118. The touchscreen 118 can be configured to detect the location and possibly pressure of one or more objects at the same time. The touchscreen 118 includes two input areas: (1) the keyboard 220, which includes a plurality of keys, each key corresponding to one or more different characters of a plurality of characters; and (2) a viewing pane 230 which displays a predetermined amount of text from a document under composition. In the example, the keyboard 220 is located below the viewing pane 230. Other locations for the input areas 220 and 230 are possible. For example, the keyboard 220 could be located at the top of the touchscreen 118, and the viewing pane 230 could be located below the keyboard 220. In yet other examples, the viewing pane 230 could be omitted.

The amount of text in viewing pane 230 from the document under composition may be limited to a predetermined number of lines of text, for example, 10 lines. The document under composition may be any type of document for any application which supports the keyboard 220, such as an email or other messaging application.

As shown in FIG. 2A, keyboard 220 is a standard QWERTY keyboard layout; however, any keyboard layout can be displayed for use in the device, such as AZERTY, QWERTZ, or a layout based on the International Telecommunication Union (ITU) standard (ITU E.161) having "ABC" on key 2, "DEF" on key 3, and so on. Keyboard 220 includes various keys that can provide different inputs, such as punctuation, letters, numbers, enter or return keys, and function keys. While keyboard 220 is shown as having a square shape, it can have any other shape (such as an oval).

As shown in FIG. 2A, electronic device 100 receives text input from keyboard 220. In this example, the device receives entry of the character "c," and outputs it to the left of cursor 240 within viewing pane 230. After receiving the input of "c," device 100 generates and displays word prediction candidates using a word prediction algorithm. In FIG. 2A, the candidates are presented in candidate ribbon 250 proximal to cursor 240 within viewing pane 230. In other embodiments, word prediction candidates may be displayed in other locations on viewing pane 230 and in different formats. Within candidate ribbon 250, each of the candidates begins with the received letter "c." The next unique character of each word is displayed by device 100 with distinguishing visual indicia to indicate to the user a shortcut for selecting that particular candidate. In FIG. 2A, the first unique character of each word prediction candidate is underlined. In other embodiments, device 100 may provide other visual indicia for the first unique character, such as displaying the character in a different color, displaying the character in a different font, displaying the character in a different size font, etc.

In the example illustrated in FIG. 2A, the word being received by device 100 via keyboard 220 is "cacao." In FIG. 2A, "cacao" is the first word prediction candidate displayed within candidate ribbon 250. As represented by the translucent circle on the "A" key of keyboard 220 in FIG. 2A, keyboard 220 receives a "tap" input 260 on the "A" key. In FIG. 2B, electronic device 100, responsive to the tap on the "A" key, outputs the word prediction candidate "cacao" in viewing pane 230 to the left of cursor 240. In some embodiments, the selected word prediction may be presented in a different color (and possibly temporarily) to signal the user that a selection via tap input has been made. In some embodiments, the user can accept the word prediction selection by pressing any key on keyboard 220, such as space bar 270, or can select backspace key 280 for a new selection. In other embodiments, the selection is made automatically upon receipt of a tap input on keyboard 220. In some embodiments, device 100 may output the selected word prediction candidate to the left of cursor 240 with an extra space automatically inserted after the word.

Electronic device 100 may generate and select for display word prediction candidates based on various criteria and methods. In some embodiments, word prediction candidates may be drawn from a dictionary stored within device 100, for example, in memory 110. In other embodiments, candidates may be ranked based on various factors. The factors may include, but are not limited to, rate of previous usage by the user, context from other input words received, geographical location of the user, etc.

Figure 3A:
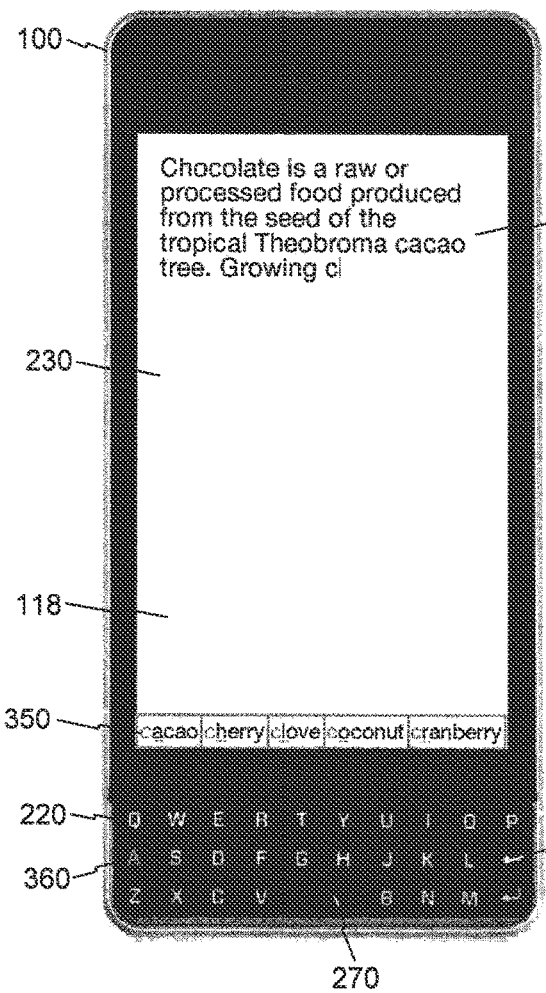
Figure 3B:
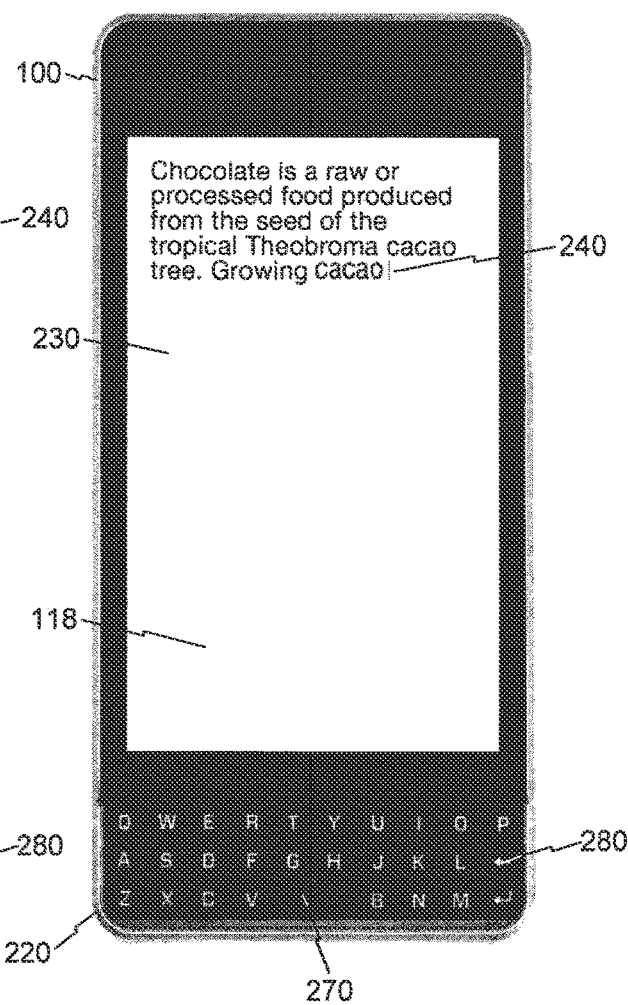

FIGS. 3A-3B illustrate further examples of electronic device 100. In FIG. 3A, the same scenario is presented as shown previously in FIG. 2A. In the example shown in FIG. 3A, word prediction candidates are displayed in candidate ribbon 350, which is located just above keyboard 220. In this embodiment, speed and accuracy of character entry and prediction candidate selection are enhanced, because the user is able to keep their focus on or near keyboard 220. In FIG. 3A, keyboard 220 receives tap input 360 from the "A" key, and in FIG. 3B, the selected word prediction candidate "cacao" appears to the left of cursor 240.

Figure 4A:
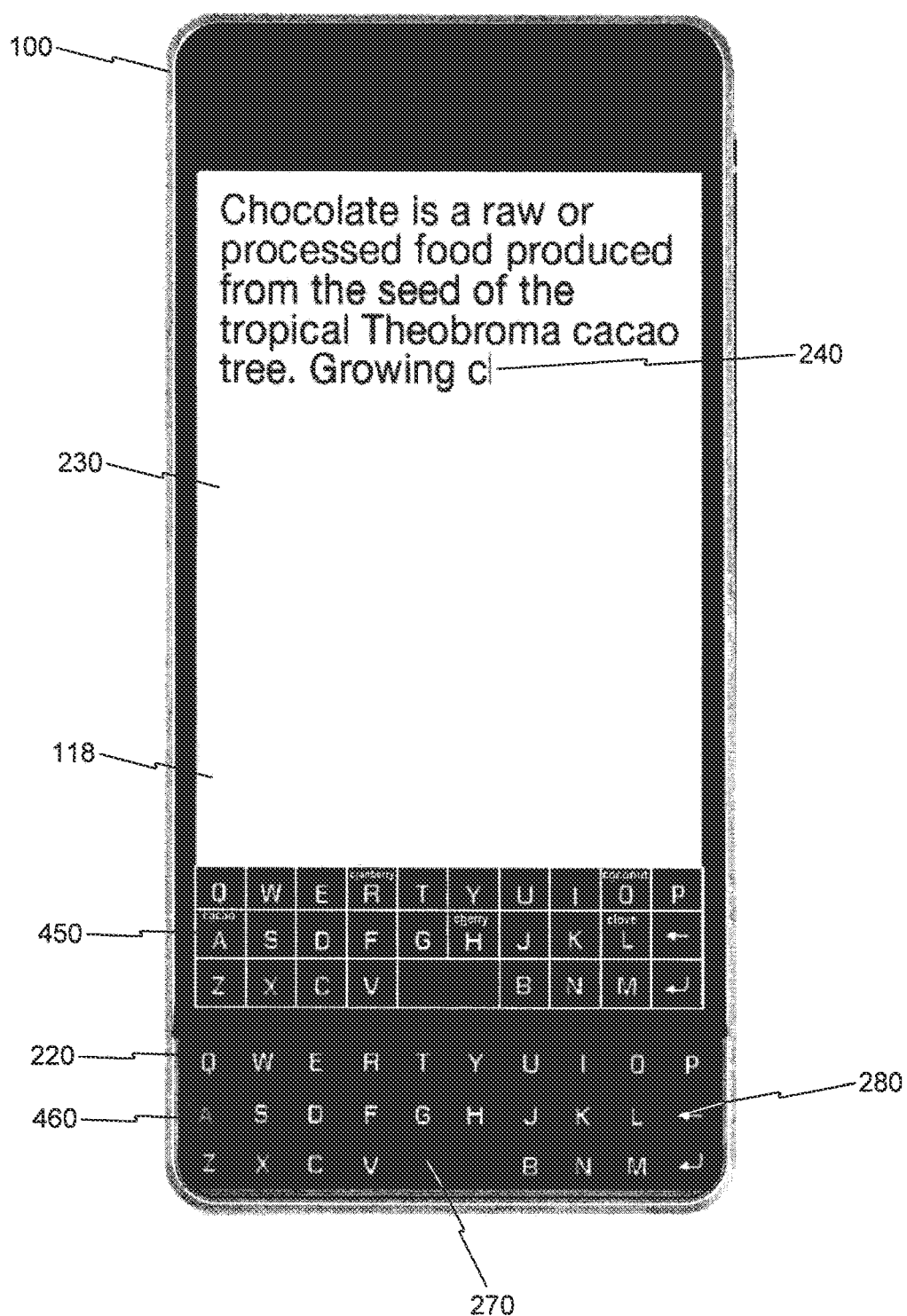
Figure 4B:
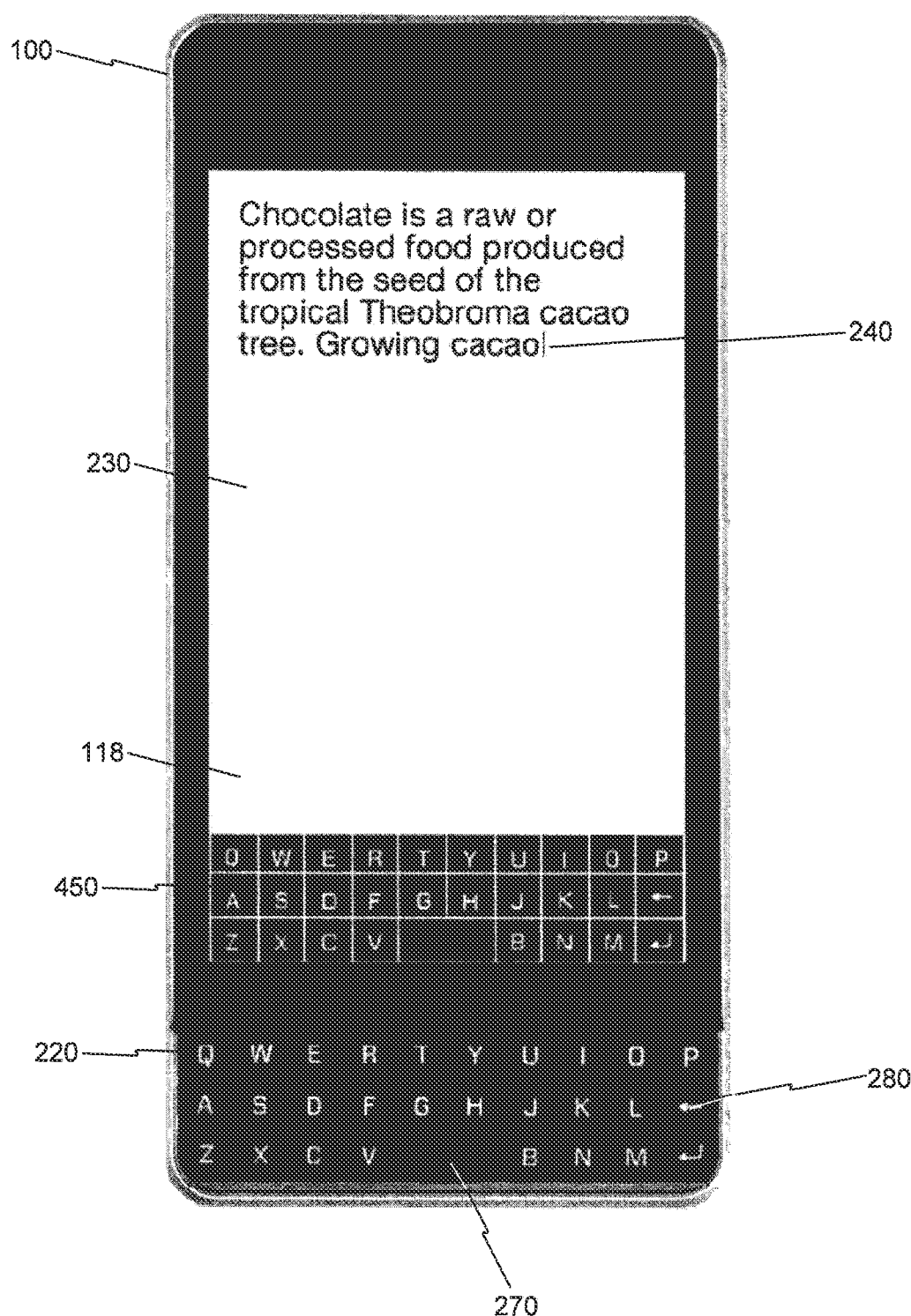

FIGS. 4A-4B illustrate further examples of electronic device 100, consistent with example embodiments disclosed herein. In some example embodiments, electronic device 100 may display a projected image of keyboard 220 onto viewing pane 230 of touchscreen 118. Projecting the keyboard image increases word prediction candidate selection speed and accuracy by providing enhanced visual clarity for the user of which predictions are available for selection. In FIG. 4A, the keyboard is projected as keyboard projection image 450 at the bottom of touchscreen 118. Keyboard projection image 450 may be displayed anywhere within touchscreen 118 and viewing pane 230. In this example, as illustrated previously in association with FIGS. 2A-2B and 3A-3B, the device registers entry of the character "c." Device 100 again displays word prediction candidates, but this time displays each of the word prediction candidates above the key associated with their respective selection in keyboard projection image 450. Keyboard 220 receives tap input 460 from the "A" key, and in FIG. 4B, the word prediction candidate "cacao" appears to the left of cursor 240.

Figure 5A:
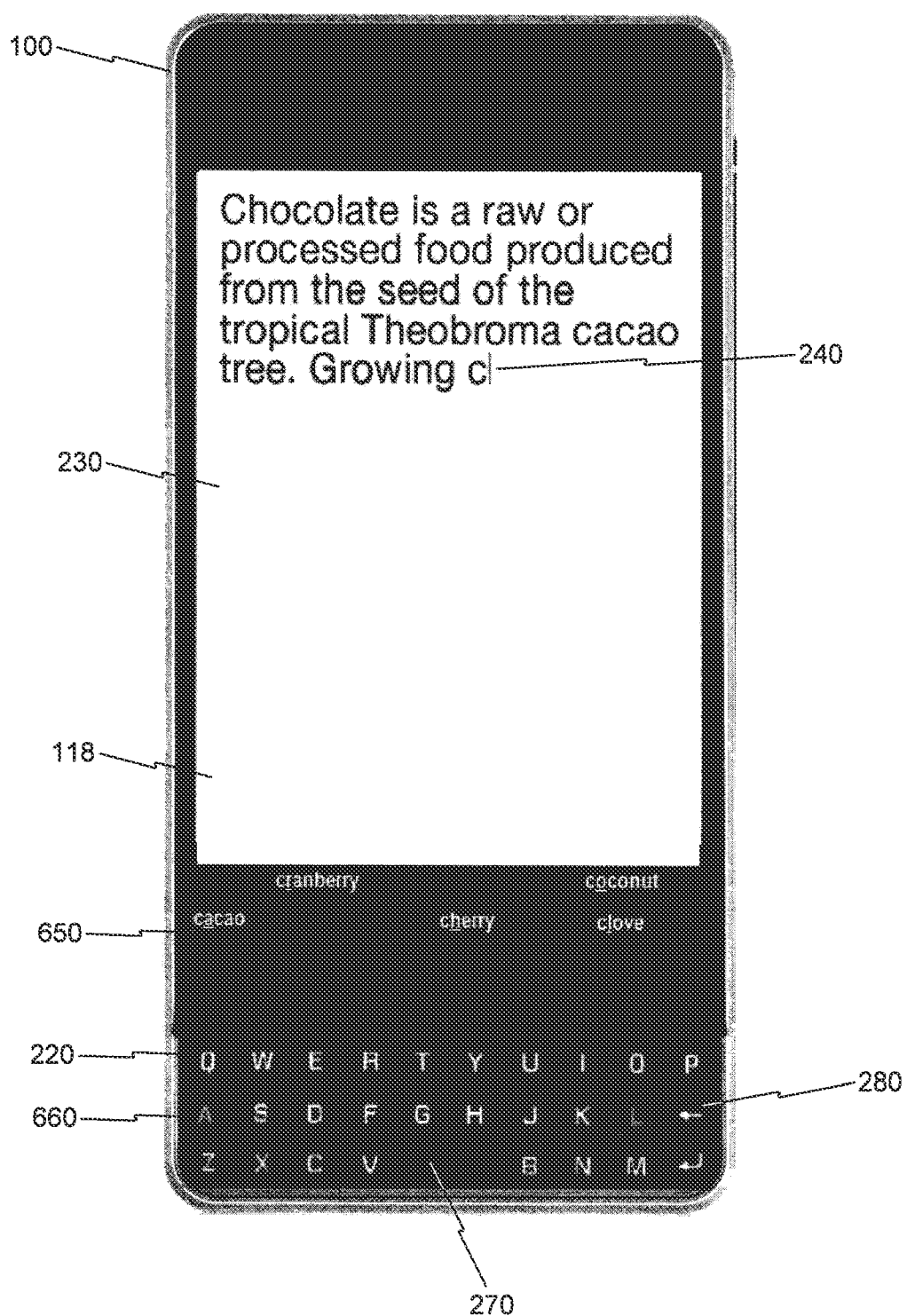
Figure 5B:
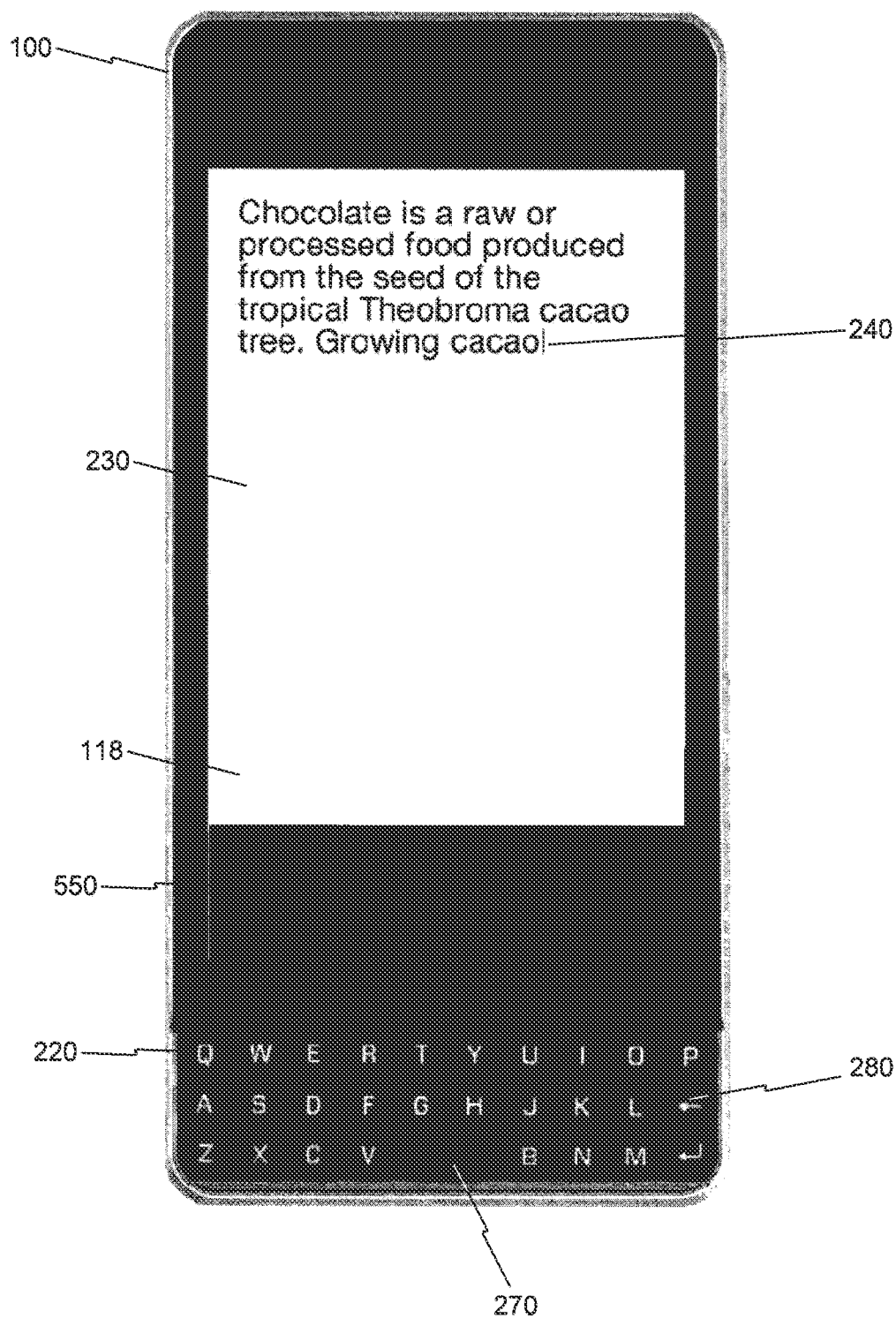

FIGS. 5A-5B illustrate further examples of electronic device 100, consistent with example embodiments disclosed herein. As in FIG. 4A, in FIG. 5A the keyboard is projected as keyboard projection image 550 at the bottom of touchscreen 118. Keyboard projection image 550 may be displayed anywhere within touchscreen 118 and viewing pane 230. Keyboard projection image 550 differs from keyboard projection image 450 in that the letters of the keys are not displayed within the projected image. Additionally, in some embodiments, the word prediction candidates may be enlarged slightly and span more than one key. This feature can increase user speed and accuracy by reducing eye strain and emphasizing the flexibility and sensitivity of keyboard 220. In this example, as illustrated previously, the device registers entry of the character "c." Device 100 again displays word prediction candidates above the projected location of the key associated with their respective selection in keyboard projection image 550. Keyboard 220 receives tap input 560 from the "A" key, and in FIG. 5B, the word prediction candidate "cacao" appears to the left of cursor 240.

Figure 6A:
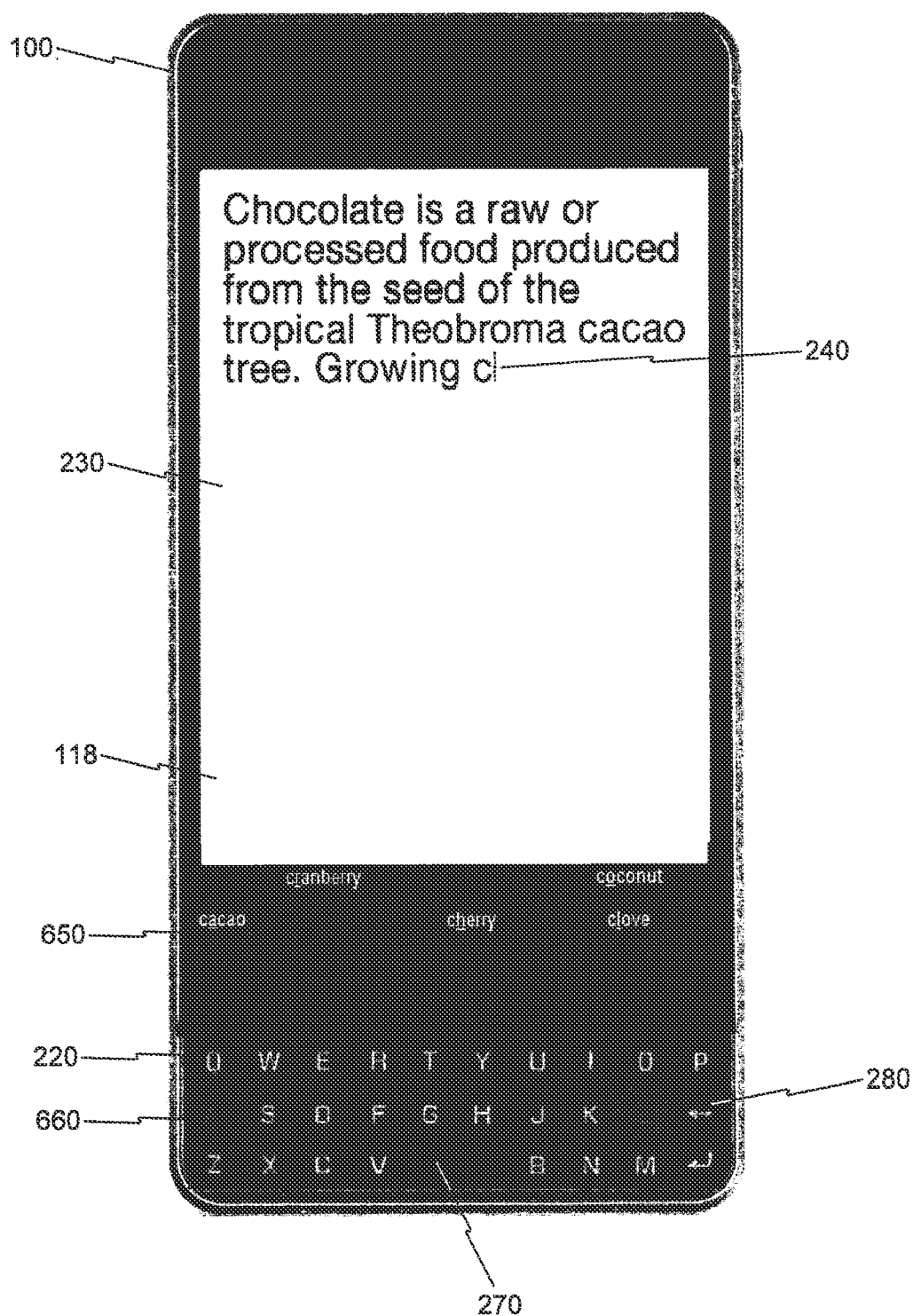
Figure 6B:
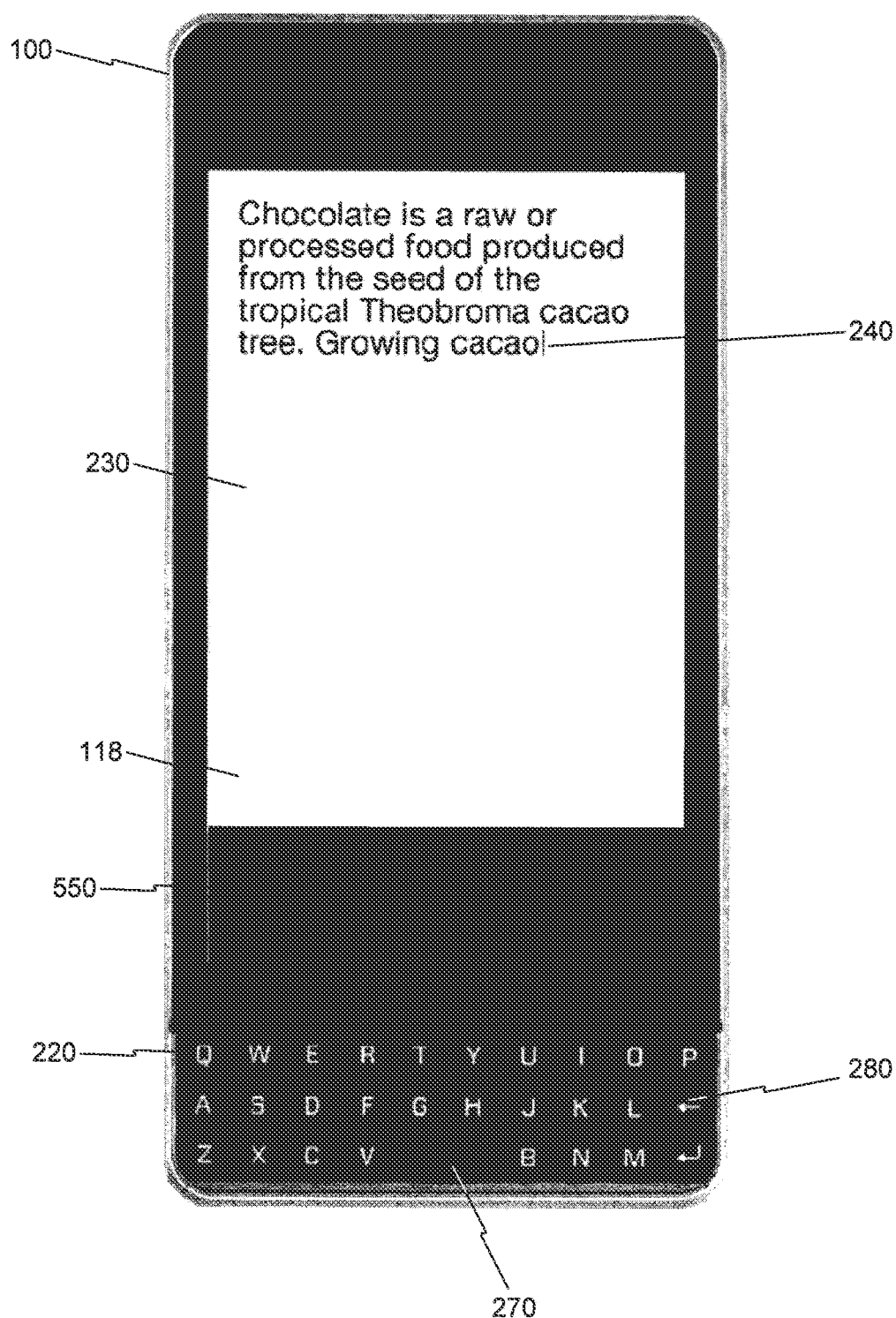

FIGS. 6A-6B illustrate further examples of electronic device 100, consistent with example embodiments disclosed herein. As in FIG. 5A, in FIG. 6A the keyboard is projected as keyboard projection image 650 at the bottom of touchscreen 118. Keyboard projection image 650 may be displayed anywhere within touchscreen 118 and viewing pane 230. As in keyboard projection image 550, keyboard projection image 650 does not display the letters of the keys of keyboard 220 within the projected image. Additionally, in some embodiments, the word prediction candidates may be enlarged slightly and span more than one key. This feature can increase user speed and accuracy by reducing eye strain and emphasizing the flexibility and sensitivity of keyboard 220.

In some embodiments, such as that illustrated in FIG. 6A, capacitive sensors 122 may sense the locations of digits, such as fingers or thumbs, on keyboard 220. Device 100 can then provide visual feedback to the user comprising the detected location of the digits on keyboard 220 within keyboard projection image 650. This feedback can then quickly and accurately show the user which, if any, word prediction candidate or candidates can be selected by the digits. In FIG. 6A, one digit is detected by keyboard 220 at the "a" key, and another is detected at the "I" key. Keyboard projection image 650 thus represents the locations of the digits in a different color. In alternative embodiments, the locations of the digits may be displayed within keyboard projection image 650 via other means, such as different shapes, lines, etc. In some embodiments, keyboard 220 may be capable of expanding the area of the keyboard that can receive tap inputs to select word prediction candidates. For example, in FIG. 6A, as indicated in keyboard projection image 650, the user can tap either the "a" or "s" keys to select the word prediction candidate "cacao," and can tap either the "k" or "l" keys (and in some embodiments, backspace key 280) to select the word prediction candidate "clove."

In the example illustrated in FIG. 6A, as illustrated previously, the device registers entry of the character "c." Device 100 again displays word prediction candidates above the projected location of the key associated with their respective selection in keyboard projection image 550. Keyboard 220 receives tap input 560 from the "A" key, and in FIG. 6B, the word prediction candidate "cacao" appears to the left of cursor 240. Other variations of keyboard projection images 450, 550, or 650 may be employed in alternative embodiments that improve speed and accuracy of prediction candidate selection by visually associating the prediction candidates with the particular key of keyboard 220 which, when tapped, will result in selection of that particular prediction candidate.

Figure 7:
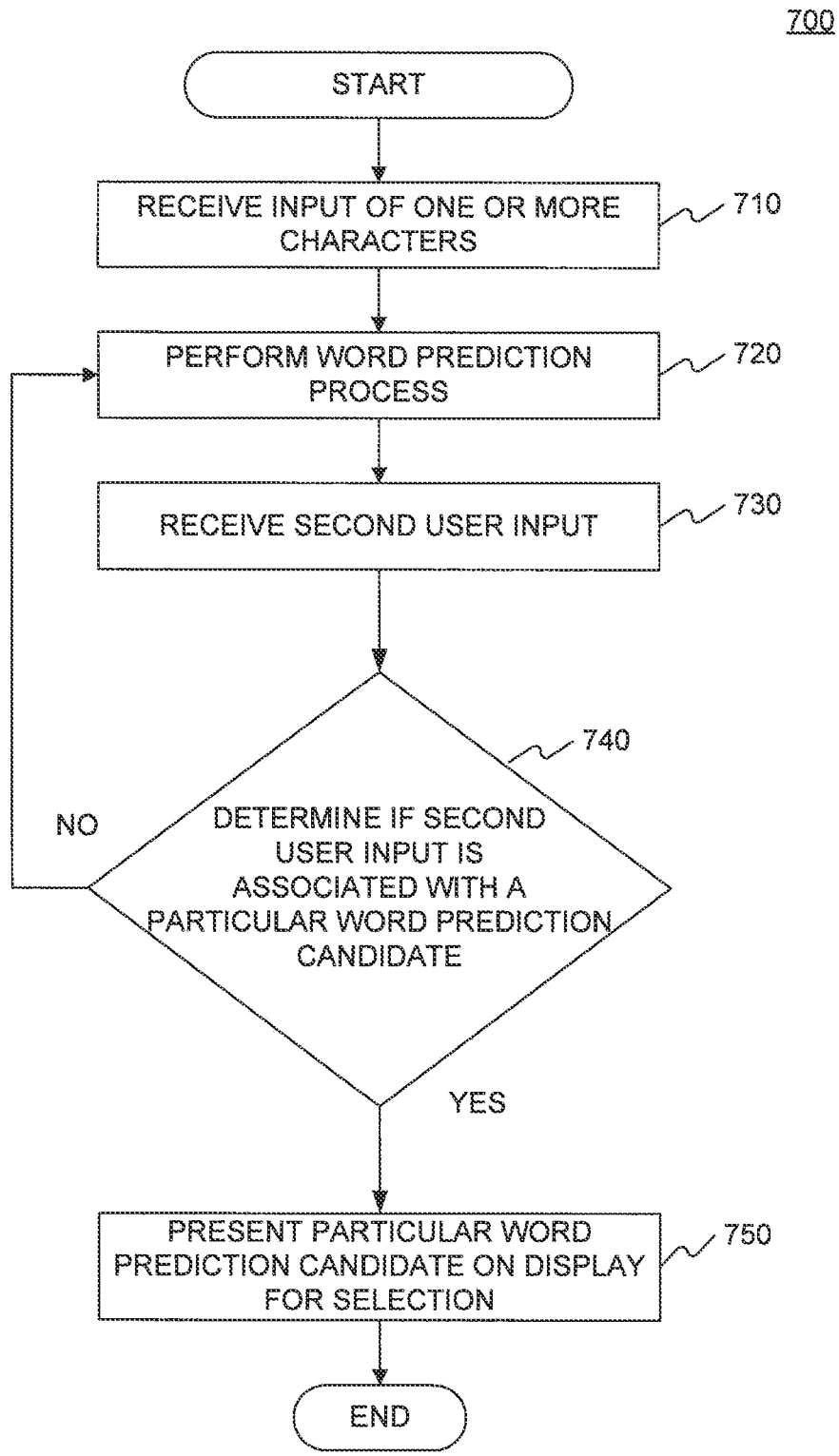
FIGS. 7 and 8 are flow charts showing example word prediction candidate selection processes, consistent with embodiments disclosed herein.

FIG. 7 is a flow chart showing a word prediction candidate selection process 700, consistent with example embodiments disclosed herein. Electronic device 100 receives text input via keyboard 220 of a plurality of characters (Step 710). Based on the input characters, electronic device 100 may perform a word prediction process (Step 720). The word prediction process will be described in detail in association with FIG. 8. In brief, electronic device 100 generates and displays a set of additional characters as candidates to complete words containing the characters input by the user in Step 710, or variations thereof. Responsive to further input by the user via keyboard 220, electronic device 100 displays a selected word candidate within viewing pane 230.

Word prediction and completion process 700 proceeds with electronic device 100 receiving a second input via keyboard 220 (Step 730). In some embodiments, the input may be a single character input from keyboard 220. In some embodiments, the input may be in the form of a tap input on one of the keys of keyboard 220. In alternative embodiments, the input may be a key press input on one of the keys of keyboard 220.

Electronic device 100, via processor 102, determines whether the input is associated with a particular one of the displayed word prediction candidates (Step 740). In brief, electronic device 100 associates each of the word prediction candidates with a single character that permits the candidate to be presented on the display for selection responsive to input of that particular character. Responsive to input of a single character via keyboard 220, electronic device 100 determines whether the input corresponds to one of the previously displayed word prediction candidates. The determination accounts for both the nature of the input and the identity of the input character. For example, electronic device 100 determines whether the input via keyboard 220 is a tap input or a key press input. Additionally, the character input is compared to the single character associated with each of the word prediction candidates. If the input character is not associated with any of the displayed word prediction candidates (Step 740: NO), word prediction candidate selection process 700 returns to Step 720 and re-performs the word prediction process. A new set of word prediction candidates is generated based on the input received, and new word prediction candidates are displayed. If the input character is associated with a particular one of the displayed word prediction candidates (Step 740: YES), then electronic device 100 presents that particular word prediction candidate in viewing pane 230 of touchscreen 118 (Step 750). In some embodiments, device 100 may detect an input reflecting selection of the presented particular word prediction candidate. Responsive to detection of the input, device 100 displays the selected candidate in an input field on the display, such as viewing pane 230. In alternative embodiments, device 100 may receive an input indicating that the presented particular word prediction candidate is rejected for selection. Processor 102 then determines a different particular word prediction candidate from among the generated set of word prediction candidates based on the second input, and presents the different particular word prediction candidate on the display for selection.

Figure 8:
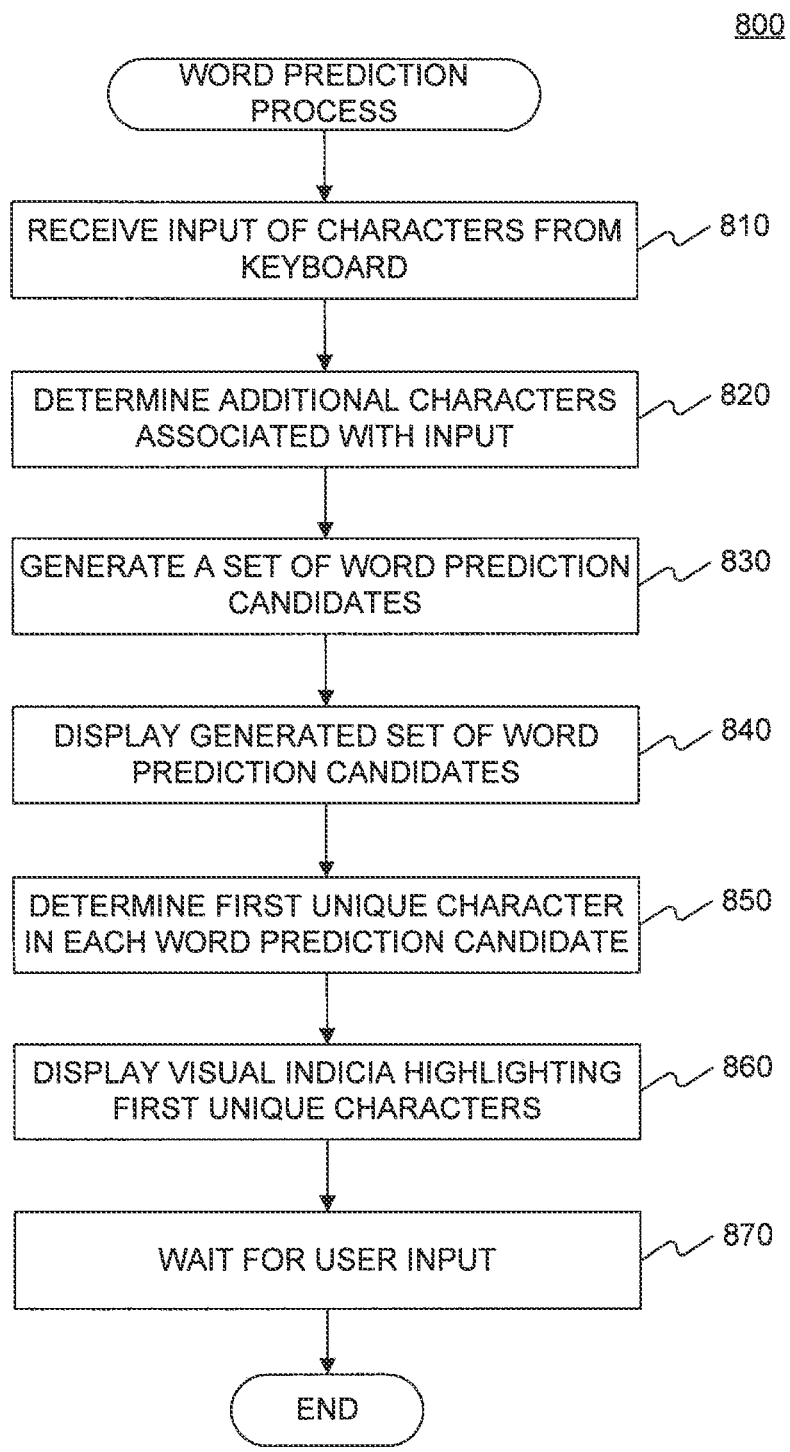

FIG. 8 is a flow chart showing a word prediction process 800, consistent with example embodiments disclosed herein. In one embodiment, electronic device 100 may receive input of one or more characters from keyboard 220 (Step 810). Electronic device 100, through processor 102 and memory 110, determines and predicts a set of additional characters associated with the input characters (Step 820). As discussed above in association with FIGS. 2A-2B, 3A-3B, and 4A-4B, the set of additional associated characters may be determined based on prior inputs by the user, sentence context, or other known means.

Processor 102 generates a set of word prediction candidates based on the input characters and the set of other possible associated characters (Step 830). Electronic device 100 may bias the word prediction candidates based on various probabilities. In one embodiment, a word prediction candidate may alternatively have a higher probability of selection based on prior usage of the word by the user. In one embodiment, a word prediction candidate may alternatively have a higher probability of selection based on context clues within the typing task. In one embodiment, a word prediction candidate may alternatively have a higher probability of selection based on historical usage by other users of the language.

Electronic device 100 displays the generated word prediction candidates on viewing pane 230 of touchscreen 118 (Step 840). Prediction candidates may be displayed in various places within viewing pane 230, or at the top of touchscreen 118. As non-limiting examples, the generated set of word prediction candidates may be displayed as illustrated in FIG. 2A, FIG. 3A, or FIG. 4A.

Electronic device 100 determines the first unique character in each word prediction candidate of the generated set (Step 850). The first one or more characters of each word prediction candidate are identical, as they are the characters corresponding to the first received input of characters from Step 810. Device 100 determines the next character in each word that is unique from each of the other word prediction candidates. If no character in one of the predictions is unique, that word prediction candidate may be removed from the display. Alternatively, that word prediction candidate may be maintained on the display but displayed in a different manner, such as a different color, a different font, or a different font size.

Electronic device 100 displays visual indicia highlighting the first unique character in each word prediction candidate within viewing pane 230, such as within candidate ribbon 250, candidate ribbon 350, or keyboard projection images 450, 550, or 650 (Step 860). Device 100 may employ various visual indicia to highlight the first unique character, including but not limited to underlining the character, displaying the character in boldface, displaying the character in italics, displaying the character in a different color, displaying the character in a different font, displaying the character in a different size font, etc. After displaying the word prediction candidates and the associated visual indicia, electronic device 100 waits for user input via keyboard 220, and previously described word prediction candidate selection process 700 proceeds to Step 730.

Embodiments and all of the functional operations described in this specification can be implemented in digital electronic circuitry, or in computer software, firmware, or hardware, including the structures disclosed in this specification and their structural equivalents, or in combinations of them. Embodiments can be implemented as one or more computer program products, i.e., one or more modules of computer program instructions encoded on a computer readable medium, e.g., a machine readable storage device, a machine readable storage medium, a memory device, or a machine readable propagated signal, for execution by, or to control the operation of, data processing apparatus.

The terms "electronic device" and "data processing apparatus" encompass all apparatuses, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, which is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand-alone program or as a module, component, subroutine, non-transitory form, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification (e.g., FIGS. 7 and 8) can be performed by one or more programmable processors executing one or more computer programs to perform functions by operating on input data and generating output. The processes and logic flows can also be performed by, and apparatuses can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

What is claimed is:

1. A method for operating an electronic device having a display displaying, in a keyboard pane of the display, a keyboard for receiving inputs comprising:
   receiving a first input of a character in an input field, wherein the first input is a key press input representing an engagement of an electronic dome switch corresponding to the character;
   generating a set of word prediction candidates associated with the first input;
   displaying the set of word prediction candidates on the display;
   determining at least one unique character in each word prediction candidate, the at least one unique character enabling discrete selection of the word prediction candidate from the set of word prediction candidates;

displaying, for each displayed word prediction candidate, a particular visual indicia identifying the unique character included within the displayed word prediction candidate, wherein the particular visual indicia is displayed in a viewing pane of the display, and the viewing pane of the display is distinct from the keyboard pane of the display;

receiving a second input of a single character, the second input comprising a tap input received by the keyboard at a key corresponding to the single character, the tap input comprising a touch event associated with the key which does not engage an electronic dome switch associated with the key;

determining that the single character of the second input corresponds to at least one determined unique character associated with a particular word prediction candidate; and in response to the determination, automatically displaying the particular word prediction candidate in the input field.

2. The method of claim 1, wherein the tap input is a touch input for a duration less than or equal to a first time period.

3. The method of claim 1, wherein displaying visual indicia comprises displaying the unique character underlined.

4. The method of claim 1, wherein displaying visual indicia comprises displaying the unique character in a different color.

5. The method of claim 1, wherein displaying visual indicia comprises displaying a diagram of a keyboard layout with each word prediction candidate from the generated set of word prediction candidates displayed on a key of the keyboard layout diagram associated with the determined unique character in each respective word prediction candidate.

6. The method of claim 5, wherein the diagram additionally displays a location of one or more digits detected on the keyboard by capacitive sensors integrated within, situated above, or situated below the keys of said keyboard.

7. The method of claim 1, wherein determining a particular word prediction candidate from among the generated set of word prediction candidates based on the second input comprises:

comparing the input character to a first unique character of each word prediction candidate; and determining whether the input character matches the first unique character of a particular one of the word prediction candidates.

8. The method of claim 1, further comprising:

determining that the single character associated with the second input does not correspond with any of the displayed word prediction candidates;

generating additional word prediction candidates based on the first and second inputs received from the keyboard;

displaying the additional word prediction candidates on the display; and providing an indication of a unique character in each additional displayed word prediction candidate to facilitate candidate selection.

9. The method of claim 1, further comprising:

responsive to detection of an input reflecting selection of the displayed particular word prediction candidate, displaying the selected candidate in the input field on the display.

10. The method of claim 1, further comprising:

receiving an input indicating that the displayed particular word prediction candidate is rejected for selection;

determining a different particular word prediction candidate from among the generated set of word prediction candidates based on the second input; and displaying the different particular word prediction candidate on the display for selection.

11. An electronic device having a display displaying, in a keyboard pane of the display, a keyboard for receiving inputs, comprising:

a memory containing instructions; and one or more processors configured to execute the instructions to:

receive a first input of a character in an input field, wherein the first input is a key press input representing an engagement of an electronic dome switch corresponding to the character;

generate a set of word prediction candidates associated with the first input;

display the set of word predictions on the display;

determine at least one unique character in each word prediction candidate, the at least one unique character enabling discrete selection of the word prediction candidate from the set of word prediction candidates;

display, for each displayed word prediction candidate, a particular visual indicia identifying the unique character included within the displayed word prediction candidate, wherein the particular visual indicia is displayed in a viewing pane of the display, and the viewing pane of the display is distinct from the keyboard pane of the display;

receive a second input of a single character, the second input comprising a tap input received by the keyboard at a key corresponding to the single character, the tap input comprising a touch event associated with the key which does not engage an electronic dome switch associated with the key;

determine that the single character of the second input corresponds to at least one unique character associated with a particular word prediction candidate; and in response to the determination, automatically display the particular word prediction candidate in the input field.

12. The electronic device of claim 11, wherein the tap input is a touch input for a duration less than or equal to a first time period.

13. The electronic device of claim 11, wherein displaying visual indicia comprises displaying the unique character underlined.

14. The electronic device of claim 11, wherein displaying visual indicia comprises displaying the unique character in a different color.

15. The electronic device of claim 11, wherein displaying visual indicia comprises displaying a diagram of a keyboard layout with each word prediction candidate from the generated set of word prediction candidates displayed on a key of the keyboard layout diagram associated with the determined unique character in each respective word prediction candidate.

16. The electronic device of claim 15, wherein the diagram additionally displays a location of one or more digits detected on the keyboard by capacitive sensors integrated within, situated above, or situated below the keys of said keyboard.

17. The electronic device of claim 11, wherein determining a particular word prediction candidate from among the generated set of word prediction candidates based on the second input comprises:
- comparing the input character to a first unique character of each word prediction candidate; and
- determining whether the input character matches the first unique character of a particular one of the word prediction candidates.

18. The electronic device of claim 11, wherein the one or more processors are further configured to:
- determine that the single character associated with the second input does not correspond with any of the displayed word prediction candidates;
- generate additional word prediction candidates based on the first and second inputs received from the keyboard;
- display the additional word prediction candidates on the display; and
- provide an indication of a unique character in each additional displayed word prediction candidate to facilitate candidate selection.

19. A non-transitory computer-readable storage medium storing one or more programs, the one or more programs comprising instructions, when executed by an electronic device having a display displaying, in a keyboard pane of the display, a keyboard for receiving inputs, that cause the device to:
- receive a first input of a character in an input field, wherein the first input is a key press input representing an engagement of an electronic dome switch corresponding to the character;
- generate a set of word prediction candidates associated with the input;
- display the set of word predictions on the display;
- determine at least one unique character in each word prediction candidate, the at least one unique character enabling discrete selection of the word prediction candidate from the set of word prediction candidates;
- display, for each displayed word prediction candidate, a particular visual indicia identifying the unique character included within the displayed word prediction candidate, wherein the particular visual indicia is displayed in a viewing pane of the display, and the viewing pane of the display is distinct from the keyboard pane of the display;
- receive a second input of a single character, the second input comprising a tap input received by the keyboard at a key corresponding to the single character, the tap input comprising a touch event associated with the key which does not engage an electronic dome switch associated with the key;
- determine that the single character of the second input corresponds to at least one determined unique character associated with a particular word prediction candidate; and
- in response to the determination, automatically display the particular word prediction candidate in the input field.

20. The non-transitory computer-readable storage medium of claim 19, wherein displaying visual indicia comprises displaying a diagram of a keyboard layout with each word prediction candidate from the generated set of word prediction candidates displayed on a key of the keyboard layout diagram associated with the determined unique character in each respective word prediction candidate.

* * * * *